United States Patent [19]
LeRoy

[11] 3,739,354
[45] June 12, 1973

[54] VARIABLE CAPACITY MEMORY

[75] Inventor: Guy LeRoy, Lannion, France

[73] Assignees: Societe Lannionnaise D'Electronique, Lannion; Compagnie Industrielle Des Telecommunications, Paris, France

[22] Filed: Apr. 19, 1971

[21] Appl. No.: 135,248

[30] Foreign Application Priority Data
Apr. 17, 1970 France .............................. 7013977

[52] U.S. Cl. .............................. 340/173 R, 307/223
[51] Int. Cl. ........................................... G11c 21/00
[58] Field of Search .................. 307/223 R, 223 B, 307/223 C, 238; 340/173 R, 174 SR, 174 A, 174 WA

[56] References Cited

UNITED STATES PATENTS

| | | | |
|---|---|---|---|
| 3,027,546 | 3/1962 | Howes et al. | 340/174 WA |
| 3,108,193 | 10/1963 | Schreiner | 340/174 SR |
| 2,911,622 | 11/1959 | Ayres et al. | 340/174 SR |
| 3,408,505 | 10/1968 | Coolidge, Jr. et al. | 340/174 SR |
| 3,533,102 | 10/1970 | Rowe | 340/174 SR |

*Primary Examiner*—Stanley M. Urynowicz, Jr.
*Attorney*—Craig, Antonelli & Hill

[57] ABSTRACT

The device according to the invention comprises essentially a memory M having a useful capacity n which is lower than N, N representing the number of words contained in a frame T of a pulse code modulation system, and an advance clock of the said memory, supplying pulses $H^x$ according to a certain distribution arrangement in time of the frame, based on a fixed period clock H.

12 Claims, 4 Drawing Figures

INVENTOR
GUY LE ROY
BY Craig, Antonelli & Hill
ATTORNEYS

INVENTOR
GUY LE ROY
BY
Craig, Antonelli & Hill
ATTORNEYS

VARIABLE CAPACITY MEMORY

The invention concerns step-by-step propagation memories, extensible or otherwise, looped or otherwise, consisting of a support in which binary data is propagated, under the control of one or several advance clocks. The data is composed of words formed by a certain number of binary elements each of which takes the value 0 or 1; the word is the unit of data. When the binary elements forming a word succeed each other in time on a unique memory line or channel, the word is said to be series propagated; if, on the other hand, the binary elements forming a word are applied simultaneously each to a particular line or channel of the memory, the word is said to be parallel propagated. A memory is said to have a series or parallel structure according to whether the words are propagated in series or in parallel therein; in the first case, it consists of a single line or channel, in the second case, it consists of as many lines or channels as there are binary elements composing the word.

Throughout the following text, the term elementary memory will be applied to the storage arrangement for the binary elements taken as a whole which form a word, whatever type of memory is used, series or parallel; it follows that the capacity of a memory will be expressed by the number N of words it can contain, each word being formed by k binary elements.

If we call the period of the clock t, the cycle time of the memory or propagation time in a line is $Tp=Nt$ for a parallel type memory and $Ts=Nkt$ for a series type memory, the two memories having the same capacity N.

In a number of applications, in particular in the case where the circuit of the memory is looped to form a permanent circulating memory, the propagation time or cycle time is constant.

If, therefore, the clock period t is the same in both types of memories having the same capacity N, it can be seen that $Ts=kTp$, this being normal since all of the $Nk$ binary elements of the series memory must move in series for a binary element to pass through the memory; this brings out the well-known fact that the parallel memories are faster, for an equal clock period, that the series memories are faster, for an equal clock period, and that, to obtain a cycle time comparable or equal to that of a parallel memory, the clock time of a series memory is much smaller than the clock time of a parallel memory; this means also that the frequency of the clock of a series memory is then much greater than the frequency of the clock of a parallel memory; in particular, if the capacities of the memories are the same, being N, the clock frequency of a series memory having the cycle period T, as an equivalent parallel memory is $k$ times greater than the clock frequency necessary for the said parallel memory.

The $N = Tp/t$ or $N = Ts/Kt$ clock pulses of a cycle T, taken as a whole, form a frame on which it is possible to number the pulses from 1 to N; likewise, it is possible to number the intervals of time or periods comprised between two clock pulses in the frame, and, therefore, to detect data in time, by its instant of presence at the input or at the output of the line, this instant forming the address of the information; this is necessary, as much for the feeding as for the read-out of data. The addressing capacity of a memory is therefore equal to the capacity N of that memory; in the case of a parallel memory, this capacity is equal to the number of instants t of the frame T whereas in the case of a series memory, this capacity is equal to the number $t/k$ of instants of the frame T; these numbers $t$ or $t/k$ according to whether the memory in question is a parallel or series memory, define the number of time channels of the frame T, the number of time channels being equal to the number of words N.

It is current, in the use of a memory, for the number of words to be stored to be less than the capacity of the frame; this situation can correspond, for example, to a reduced working during a certain time.

One solution consists in producing a circulating memory having the capacity of the frame, this being N, thus incurring a great expense for equipment, for a partial use, the fully capacity being reached only progressively as needs increase.

The memory according to the invention is characterized in that it has only one useful capacity n, in that the distribution in the pulses of a clock controlling the advance of the said memory is consistent with the word distribution diagram in the frame and in that only the pulses or groups of pulses having the same order as the words are kept in the clock frame.

According to another characteristic, the advance system of the memory comprises one or several advance clocks obtained by conditioning one or several recurring clocks by a gating pulse reproducing the distribution of the words in the frame.

According to another characteristic, the position of the data in the frame, in a memory other than a circulating memory, is modified in time by the modification of the gating pulse.

According to another characteristic, a memory of n words can be brought up to N words, progressively or otherwise, by adding the necessary number of memories and by modifying simultaneously the gating pulses.

According to another characteristic, all the instants of the frame are applied to a distribution circuit connected to an element supplying the gating pulses, by electrical connections or bridges, which can be modified at will, so as to transmit to the said element only the instants corresponding to the words in the frame.

The characteristics of the memory according to the invention will be better understood from the detailed description of embodiments which follow, given merely by way of example, and from the figures in the annexed drawings in which.

Figure 1:
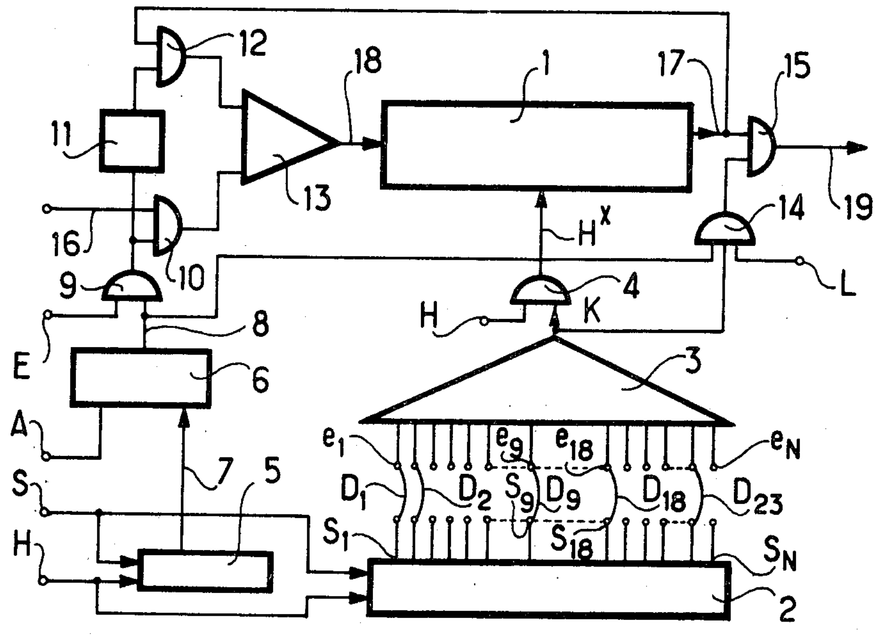
FIG. 1 is a memory whose circulation can be extended up to the capacity N, being of the parallel type, for example.

FIG. 1 shows a memory whose circulation can be extended up to the capacity N, being of the parallel type, for example; in this figure, 1 is the step-by-step circulating memory, comprising n steps, 2 is a distributor having N outputs referenced $s$1 to $s$N, 3 is an OR gate having inputs $e_1$ to $e_N$, corresponding to the outputs of the distributor, 4 is an AND gate having an input for a clock H and an input for the data K coming from the gate 3; the data $H^x$ coming out of the gate 4 is applied to the memory 1. The distributor 2 and the gate 3 are connected by a certain number of connections D, such as, for example, D1, D2, D9, D18, D23; the distributor receives clock signals H and signals S called frame synchronizing signals. An address counter 5 receives the clock signals H and the frame synchronization signals S; 6 is a comparator which receives at A the address of a word, and at 7, data coming from the address counter 5; 9 is an AND gate receiving, on the one hand, data coming from the output 8 of the comparator, and on the other hand, a writing order E; 10 is an AND gate receiving, on the one hand, data from the gate 9, and on the other hand, data to be memorized by the writing channel 16; 11 is an inverter receiving data from the gate 9; 12 is an AND gate receiving data from the inverter 11 and from the output 17 of the memory 1; 13 is an OR gate whose inputs are connected to the gates 10 and 12, the output 18 of the OR gate being applied to the memory 1; 14 is an AND gate receiving, on the one hand, signals from the output 8 of the address comparator 6, and on the other hand, read-out orders L as well as the gating pulse K; 15 is an AND gate receiving data from the output 17 of the memory 1 and from the output of the gate 14; 19 is the output of the gate 15 supplying data read in the memory 1.

The operation of the memory in FIG. 1 is as follows: at the beginning of the frame, a frame synchronization signal S positions the address counter 5 on the first address and the distributor 2 on the first step corresponding to the instant 1 of the frame; under the action of the clock H, the counter 5 scans the various addresses whereas a signal appears successively on each of the outputs *s*1 to *s*N of the distributor 2; the connections D1, D2, D9, D18, D23 between the distributor 2 and the OR gate 3 enable the forming of the gating pulse K, which is applied to the AND gate 4, which, also receiving the signals of the clock H, supplies clock signals during the gating pulses K, this forming the advance clock $H^x$ for the memory 1. Moreover, the comparator 6 associated with the address counter 5 receives at A a word address and supplies, at 8, when A and the data element 7 are identical, an order enabling either read-out or writing of a word in the memory 1. If a word is to be written, the AND gate 9 which receives the data from the output of the comprator 6, also receives a writing order at E and transmits that order to the AND gate 10 which receives, also, at 16, the words to be written, and transmits these words to the OR gate 13 which transmits them through its output 18 to the memory 1. This memory receives the signals from the advance clock $H^x$, the words which arrive at 18 are inscribed only when there is a gating pulse at the advance clock $H^x$, this gating pulse corresponding, in time, to one or several addresses; in the example in FIG. 1, if it is supposed that the frame T contains 24 instants t each corresponding to a word in the case of a parallel memory, the only existing connections D1, D2, D9, D18, D23, correspond therefore to a capacity $n = 5$ of the memory 1.

The data contained in the memory 1 circulates therefore from the input 18 towards the output 17, under the control of the advance clock; all data applied to the output 17 is applied to the AND gate 12; if no writing order arrives at E at the gate 9, the gate 12 receives from 11 a writing order, so that the data coming from 1 and applied to 12 is transmitted to the OR gate 13 and written by the output 18 of 13 in the memory 1. If, on the other hand, a writing order arrives at E on the gate 9, the latter transmits that order to the gate 10, so that the data arriving at 16 is transmitted to the gate 13 and fed by the output 18 of 13 into the memory 1; of course, the gate 12 is then blocked in such a way that the data coming from the output 17 of the memory 1 is not fed again into the said memory; there has been a substitution of data in the memory 1 at the corresponding instant of the advance clock $H^x$.

When the AND gate 14 receives, through its input L, a read-out order, that gate transmits that order to the AND gate 14, and the data coming from the memory 1 is supplied to the output 19 of the gate 15. It can therefore be seen that the capacity n of the memory 1 can be fully or partly used, the words being distributed in some way in the frame T; if the distribution of the words in the frame changes or effects a change in the advance clock by changing the connections D between the elements 2 and 3, so as to obtain gating pulses reproducing the distribution of the words in the frame.

If it is required to increase the capacity of the memory, all that is needed is to connect up a certain number of binary elements to the existing memory, so as to bring the capacity up from *n* to *n*1, and to put the connections D in place between the elements 2 and 3; these connections will be, at most, equal in number to *n*1.

Figure 2:
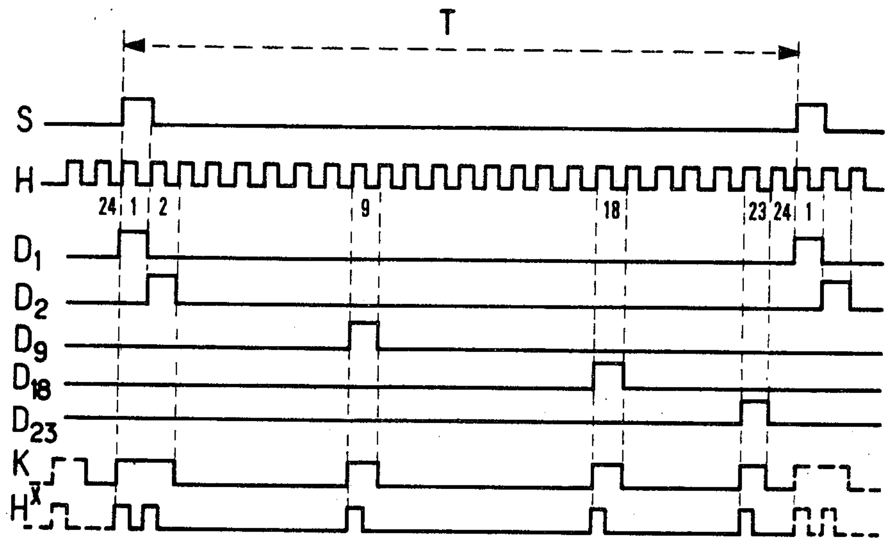
FIG. 2 is the time diagram of the memory in FIG. 1.

FIG. 2 shows the time diagram of the memory in FIG. 1; in this figure, signals S are the synchronizing signals as a function of time, the time interval T separating two signals being the frame; H is the clock which, in the case of FIG. 4, supplies 24 pulses in the time interval T; D1, D2, D9, D18 and D23 are the gating pulses of the distributor 2 in FIG. 1, as a function of time, associated with the corresponding connections; K is the output signal of the OR gate 3 in FIG. 1, as a function of time, this signal being the sum of the gating pulses D1, D2, D9, D18, D23; $H^x$ is the advance clock, as a function of time, supplied by the gate 4 in FIG. 1, the pulses being those of the clock H during the signal K, since H and K are the two inputs of the AND gate 4.

Figure 3:
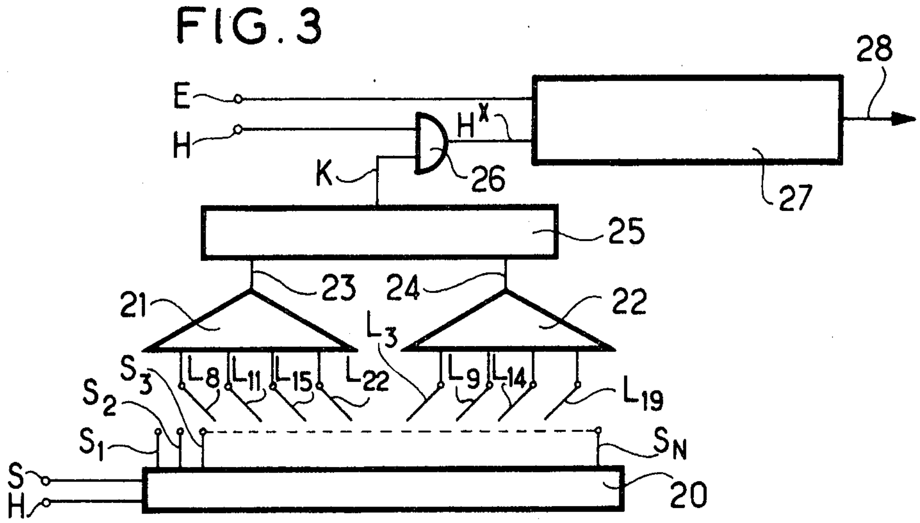
FIG. 3 is a buffer register.

FIG. 3 shows a buffer register of the series type, for example, and having a capacity n less than N; in this figure, 20 is a distributor of the same type as that in FIG. 1, for example, *s*1, *s*2, *s*3, . . . *s*N are the N outputs of this distributor which receives, at S, frame synchronizing signals, and at H, clock signals; 21 is an OR gate having multiple inputs, having an output 23 applied to a memory 25; 22 is an OR gate having multiple inputs, having an output 24 applied to the memory 25; L8, L11, L15, L22 are connections between inputs of the gate 21 and the corresponding outputs *s*8, *s*11, *s*15, *s*22 of the distributor 20; L3, L9, L14, L19 are connections between inputs of the gate 22 and the corresponding outputs *s*3, *s*9, *s*14, *s*19 of the distributor 20; K is an output of the memory 25 applied to an AND gate 26 which also receives, at an input, the clock signals H; $H^x$ is an output of the gate 26 applied to a buffer register 27, which also receives at E the data to be stored; 28 is an output of the buffer register, this output being of the series type in the case of FIG. 3.

The operation of the register according to FIG. 3 is as follows: the distributor 20 receives, at S, frame synchronizing signals, and at H, clock signals; certain clock signals are transmitted to the gates 21 or 22; thus, the clock pulses of order 8, 11, 15, 22 in the frame are directed towards the gate 21, whereas the pulses of order 3, 9, 14, 19 are directed towards the gate 22; thus, the pulse of order 3 entering the distributor 20 is directed towards the gate 22 and transmitted to the memory 25 by the output 24 of the said gate, or it remains stored as long as there is no deletion order; the pulse of order 8 entering the distributor 20 is directed towards the gate 21 and transmitted to the memory 25 by the output 23 of the said gate and constitutes the deletion order of the memory 25, which is thus released and ready to store a signal coming from the gate 22.

Thus, the memory 25, which may take the form of a simple flip-flop, will store the order corresponding to the pulse of order 9, the deletion being caused by the pulse of order 11; the memory will then store the order corresponding to the pulse of order 14, the deletion order being given by the pulse of order 15; lastly, the memory will store the order corresponding to the pulse 19, the deletion order being given by the pulse 22. The memory 25 supplies, thus, by its output K, pulses in the form of gating pulses, whose duration is variable; the gating pulses in the example in FIG. 3 have, respectively, the duration corresponding to the time separating the clock pulses 3 and 8, 9 and 11, 14 and 15, 19 and 22. The AND gate 26 receives, on the one hand, the gating pulses K coming from the memory 25, and on the other hand, the clock pulses H, and supplies, at the output $H^x$, clock pulses throughout the duration of the gating pulses K; the pulses $H^x$ constituting the advance clock of the buffer memory, or buffer register 27. The said register receives, at E, data to be stored, this data being present in the frame T during variable periods corresponding to the gating pulses K supplied previously; this data E is stored by the buffer register 27 under the action of the advance clock $H^x$; the data stored in the register progresses under the action of the clock $H^x$, from the input E towards the output 28, the propagation time, and hence, the storing period, being equal to the duration T of the frame. The buffer memory has a capacity of *n*, but the modification of the connections L between the distributor 20 and the gates 21 and 22 enables the position of the data in time to be modified; it is also possible to increase the capacity of the buffer memory 27 so as to bring it up to a capacity of *n*1 lower than the maximum capacity N compatible with the frame T, and to establish new extra connections L between the distributor 20 and the gates 21 and 22; the capacity can be increased up to a value of N.

Figure 4:
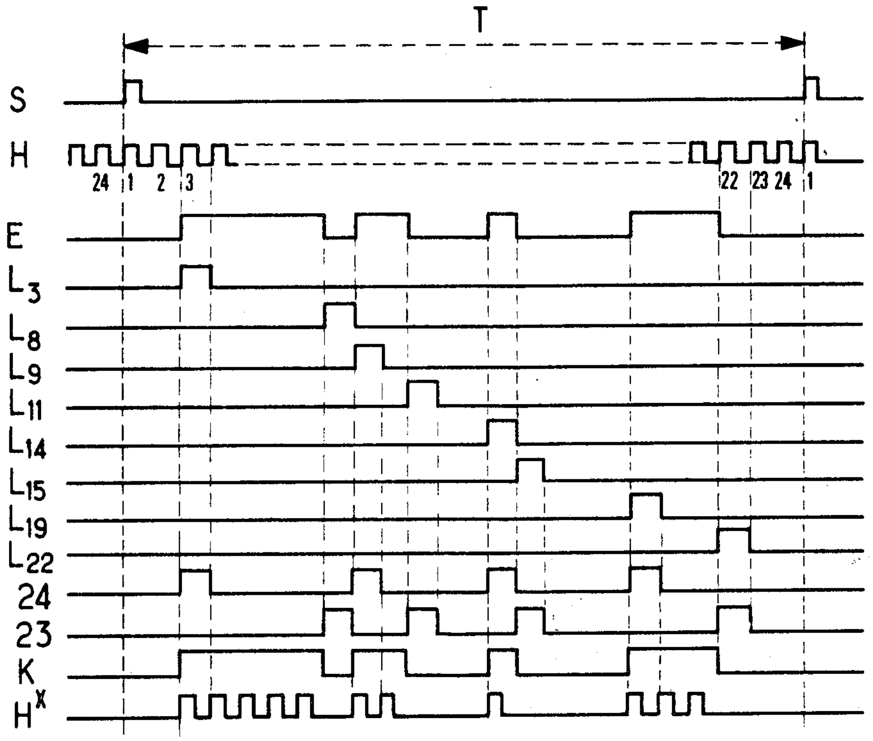
FIG. 4 is the time diagram of the register in FIG. 3.

FIG. 4 is the time diagram of the buffer memory or register in FIG. 3; in this figure, signals S are the synchronizing signals as a function of time, the time interval T separating two signals being the frame; H is the clock which, in the case of the figure, supplies 24 pulses in the time period T; L3, L8, L9, L11, L14, L15, L19, L22 being the gating pulses of the distributor 20 in FIG. 3, as a function of time, associated with the corresponding connections to the OR gates 21 and 22; 23 and 24 are, respectively, the gating pulses at the outputs 23 and 24 of the gates 21 and 22; K is the gating pulses supplied by the memory 25 in FIG. 3; $H^x$ is the advance clock; supplied by the AND gate 26 in FIG. 3, this advance clock controlling the storing of the data E and its progress into the buffer register 27.

The invention applies generally to all devices in which the data is in the form of pulses coded inside a time frame, i.e., whose operation is of the pulse code modulation type, and more particularly to pulse code modulation (PCM) type telephone installations. The embodiment according to FIG. 1 enables the use of extensible memories for constituting a central memory grouping together all the addresses in a connection network, whereas the embodiment according to FIG. 3 enables the production of a buffer access register at the level of the circuit-breakers composing a connection network.

It is to be understood that the invention is in no way limited to the embodiments described and illustrated which have been given only by way of example. More particularly, it is possible, without going beyond the scope of the invention, to modify some of these arrangements or to replace certain means by equivalent means.

What is claimed is:

1. In a storage system for storing data including timing means for generating clock signals in accordance with a recurring time frame containing N words, each word consisting of k binary elements, a memory capable of storing data in time with said applied clock signals and control means for writing new data into the system and reading data out of the system at selected storage locations corresponding to particular words or time channels of the recurring time frame only in response to control signals being selectively applied to said memory, means for generating said control signals comprising distributor means connected to said timing means for providing N sequential outputs in response to said applied clock signals and selection means for connecting only n selected outputs of said distributor means to said memory as said control signals, where n is less than N.

2. A system as defined in claim 1, wherein said selection means includes an OR gate having N inputs and a plurality of selectively removable connections extending between certain inputs of said OR gate and corresponding outputs of said distributor means.

3. A system as defined in claim 2, wherein said memory is a recirculating memory having feedback means connecting the output thereof to the input thereof.

4. A system as defined in claim 3, wherein the control signals for said memory are derived from said OR gate, the output of which is also applied to said control means to control the reading out of data from said memory.

5. A system as defined in claim 4, wherein said selection means further includes an AND gate having one input connected to the output of said OR gate, a second input receiving said clock signals, and an output providing said control signals to said memory.

6. A system as defined in claim 1, wherein said memory is a recirculating memory having feedback means connecting the output thereof to the input thereof.

7. A system as defined in claim 1, wherein said selection means includes means responsive to selected outputs of said distributor means for alternately generating on and off signals at spaced intervals and means responsive to said on and off signals for generating variable duration signals for controlling application of said clock signals as said control signals to said memory.

8. A system as defined in claim 7, wherein said memory is a buffer register having a data input and a control input connected to the output of said selection means.

9. A system as defined in claim 1, wherein said selection means includes first and second OR gates each having a plurality of inputs, a plurality of selectively removable connections extending between certain inputs of said first and second OR gates and the outputs of said distributor means, and a memory gate providing a continuous gating signal in response to receipt of an output from said first OR gate and deleting said continuous gating signal in response to receipt of an output from said second OR gate.

10. A system as defined in claim 9, wherein said selection means further includes an AND gate having one input connected to the output of said memory gate, a second input receiving said clock signals, and an output providing said control signals to said memory.

11. A system as defined in claim 9, wherein said memory is a buffer register having a data input and a control input connected to the output of said selection means.

12. A system as defined in claim 11, wherein said memory gate is a flip-flop.

* * * * *